US008694883B2

(12) United States Patent
Matsumoto

(10) Patent No.: US 8,694,883 B2
(45) Date of Patent: Apr. 8, 2014

(54) DOCUMENT MANAGEMENT SYSTEM, IMAGE PROCESSING APPARATUS, AND CONTROL METHODS AND COMPUTER PROGRAMS THEREFOR

(75) Inventor: Yoshitaka Matsumoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 47 days.

(21) Appl. No.: 13/151,972

(22) Filed: Jun. 2, 2011

(65) Prior Publication Data

US 2012/0005544 A1 Jan. 5, 2012

(30) Foreign Application Priority Data

Jul. 5, 2010 (JP) ................................. 2010-153482

(51) Int. Cl.
*G06F 17/00* (2006.01)
(52) U.S. Cl.
USPC ........... 715/273; 715/229; 715/234; 358/442; 358/462; 358/1.15; 358/448; 358/474
(58) Field of Classification Search
USPC ......... 715/273, 229, 234; 358/1.15, 448, 442, 358/462
See application file for complete search history.

(56) References Cited

U.S. PATENT DOCUMENTS

| 7,340,501 | B2 * | 3/2008 | Miida et al. ................... 709/203 |
| 7,644,320 | B2 * | 1/2010 | Kawashima ..................... 714/46 |
| 8,122,296 | B2 * | 2/2012 | Kato ................................. 714/44 |
| 8,379,246 | B2 * | 2/2013 | Kudo et al. .................. 358/1.15 |
| 2003/0055809 | A1 * | 3/2003 | Bhat ................................... 707/1 |
| 2004/0190057 | A1 * | 9/2004 | Takahashi et al. ........... 358/1.15 |
| 2006/0075300 | A1 * | 4/2006 | Mukherjee ....................... 714/38 |
| 2006/0227373 | A1 * | 10/2006 | Matoba ........................ 358/1.15 |
| 2007/0195386 | A1 * | 8/2007 | Shinohara et al. ............. 358/527 |
| 2007/0206225 | A1 * | 9/2007 | Shinohara et al. ........... 358/1.16 |
| 2009/0122342 | A1 * | 5/2009 | Kawano ....................... 358/1.15 |

2009/0307782 A1 12/2009 Matsumoto

FOREIGN PATENT DOCUMENTS

| JP | 2003-44608 | 2/2003 |
| JP | 2005-84928 | 3/2005 |
| JP | 2005-284501 | 10/2005 |
| JP | 2008-257543 | 10/2008 |
| JP | 2009124315 A | 6/2009 |

OTHER PUBLICATIONS

U.S. Appl. No. 13/049,710, filed Mar. 16, 2011 by Yoshitaka Matsumoto.
Japanese Office Action dated Jan. 27, 2014 issued during prosecution of related Japanese application No. 2010-153482.

* cited by examiner

*Primary Examiner* — Stephen Hong
*Assistant Examiner* — Matthew Ludwig
(74) *Attorney, Agent, or Firm* — Fitzpatrick, Cella, Harper & Scinto

(57) ABSTRACT

The document management system assigns property information of a scanned document when transmitting the scanned document from an MFP to a document management server PC, and stores history information related to the transmission job in a memory. Further, the MFP, on receipt of incorrectness information related to property information from the document management server PC, adds the incorrectness information to the history information. Thereafter, when a user logs into the MFP, the MFP determines whether incorrectness information is included in history information having the same user ID as a user ID of the user, and if incorrectness information is included, displays a modification screen for modifying incorrect property information. Further, once the property information has been modified via the modification screen, the MFP transmits the modified information to the document management server PC, and causes information managed by the document management server PC to be updated.

10 Claims, 9 Drawing Sheets

DOCUMENT MANAGEMENT SYSTEM, IMAGE PROCESSING APPARATUS, AND CONTROL METHODS AND COMPUTER PROGRAMS THEREFOR

BACKGROUND OF THE INVENTION

1. Field of the Invention

The present invention relates to a document management system, an image processing apparatus, and control methods and computer programs therefor.

2. Description of the Related Art

Executing a workflow for transmitting document data scanned with an MFP (hereinafter, scanned document) to an external apparatus, and utilizing the scanned document via the external apparatus is known. Specifically, there are workflows for scanning an order form with an MFP, transmitting the scanned document to a server which is an external apparatus, and inputting the content of the order form by accessing the server from a client PC. In such a workflow, the order is returned if an input error or the like occurs, and the scanned document needs to be retransmitted by the MFP before continuing the workflow. For example, the MFP retransmits the scanned document after retrieving the corresponding transmission job from the transmission history. Japanese Patent Laid-Open No. 2009-124315 proposes a technique for improving user-friendliness by displaying an error job history as thumbnails on a screen for checking the transmission history of the MFP, and retrieving error jobs using a transmission status indicating the success or failure of jobs.

However, the following problems arise with the above conventional technology. For example, the above conventional technology facilitates visually locating error jobs by displaying error jobs as thumbnails. The above conventional technology also facilitates searching for error jobs by enabling searches based on the transmission status indicating the success or failure of jobs. However, if there are a large number of error jobs, the number of search results also tends to increases, which makes it difficult for the user to go through the search results.

Also, the MFP is able to configure the settings of a transmission job related to a scanned document, such as the storage location in the external apparatus serving as the transmission destination and the properties of the scanned document, and execute transmission. However, in the case where there is a problem with the property settings and the property settings need to be modified, it is not possible to modify only the properties in the external apparatus. In other words, similarly to when an error occurs in a workflow as discussed above, the MFP, in order to perform the modification, needs to reconfigure settings such as the storage location, retransmit the scanned document to the external apparatus, and overwrite the scanned document that was previously stored.

SUMMARY OF THE INVENTION

The present invention enables realization of a document management system, an image processing apparatus, and control methods and computer programs therefor that allow a user to easily check for incorrect content related to an executed job, and enable the incorrect content to be efficiently modified.

One aspect of the present invention provides a document management system comprising a document management server and an image processing apparatus that are connected via a network, the image processing apparatus including: a reading unit that reads a document and outputs document data; a property information generation unit that generates property information indicating an attribute of the document data output from the reading unit; a first transmission unit that transmits the document data and the property information to the document management server; a storage unit that stores, in a memory, the property information related to the document data transmitted by the first transmission unit; an addition unit that, on receipt of error information related to the property information from the document management server, stores the received error information in the memory in association with the property information; a display control unit that displays, on a display unit, a modification screen for modifying erroneous property information if the error information is stored in the memory; and a second transmission unit that transmits modification information input via the modification screen to the document management server, and the document management server including: a management unit that manages the document data and property information transmitted by the first transmission unit; an error information generation unit that analyzes the property information managed by the management unit, and generates error information which is information related to an error in the property information; a notification unit that notifies the error information generated by the error information generation unit to the image processing apparatus; and an update unit that updates the property information managed by the management unit, in accordance with the modification information transmitted by the second transmission unit.

Another aspect of the present invention provides an image processing apparatus connected to a document management server via a network, comprising: a reading unit that reads a document and outputs document data; a property information generation unit that generates property information indicating an attribute of the document data output from the reading unit; a first transmission unit that transmits the document data and the property information to the document management server; a storage unit that stores, in a memory, the property information related to the document data transmitted by the first transmission unit; an addition unit that, on receipt of error information related to the property information from the document management server, stores the received error information in the memory in association with the property information; a display control unit that displays, on a display unit, a modification screen for modifying erroneous property information if the error information is stored in the memory; and a second transmission unit that transmits modification information input via the modification screen to the document management server.

Still another aspect of the present invention provides a control method for a document management system in which a document management server and an image processing apparatus are connected via a network, comprising: reading a document and outputting document data, using a reading unit of the image processing apparatus; generating property information indicating an attribute of the document data output from the reading unit, using a property information generation unit of the image processing apparatus; transmitting the document data and the property information to the document management server, using a first transmission unit of the image processing apparatus; storing, in a memory, the document data and property information transmitted by the first transmission unit, and information related to an error in the property information, using a storage unit of the image processing apparatus; managing the transmitted document data and property information, using a management unit of the document management server; analyzing the property information managed by the management unit, and generating the error information, using an error information generation unit of the document management server; notifying the error information generated by the error information generation unit to the image processing apparatus, using a notification unit of the document management server; storing, on receipt of error information related to the property information from the document management server, the received error information in the memory in association with the property information, using an addition unit of the image processing apparatus; displaying, on a display unit, a modification screen for modifying erroneous property information if the error information is stored in the memory, using a display control unit of the image processing apparatus; transmitting modification information input via the modification screen to the document management server, using a second transmission unit of the image processing apparatus; and updating the property information managed by the management unit, in accordance with the modification information transmitted by the second transmission unit, using an update unit of the document management server.

Still another aspect of the present invention provides a control method for an image processing apparatus connected to a document management server via a network, comprising: reading a document and outputting document data, using a reading unit; generating property information indicating an attribute of the document data output from the reading unit, using a property information generation unit; transmitting the document data and the property information to the document management server, using a first transmission unit; storing, in a memory, the property information related to the document data transmitted by the first transmission unit, using a storage unit; storing, on receipt of error information related to the property information from the document management server, the received error information in the memory in association with the property information, using an addition unit; displaying, on a display unit, a modification screen for modifying erroneous property information if the error information is stored in the memory, using a display control unit; and transmitting modification information input via the modification screen to the document management server, using a second transmission unit.

Further features of the present invention will be apparent from the following description of exemplary embodiments with reference to the attached drawings.

DESCRIPTION OF THE EMBODIMENTS

Embodiments of the present invention will now be described in detail with reference to the accompanying drawings. It should be noted that the relative arrangement of the components, the numerical expressions and the numerical values set forth in these embodiments do not limit the scope of the present invention unless it is specifically stated otherwise.

First Embodiment

Configuration of Document Management System

Figure 1:
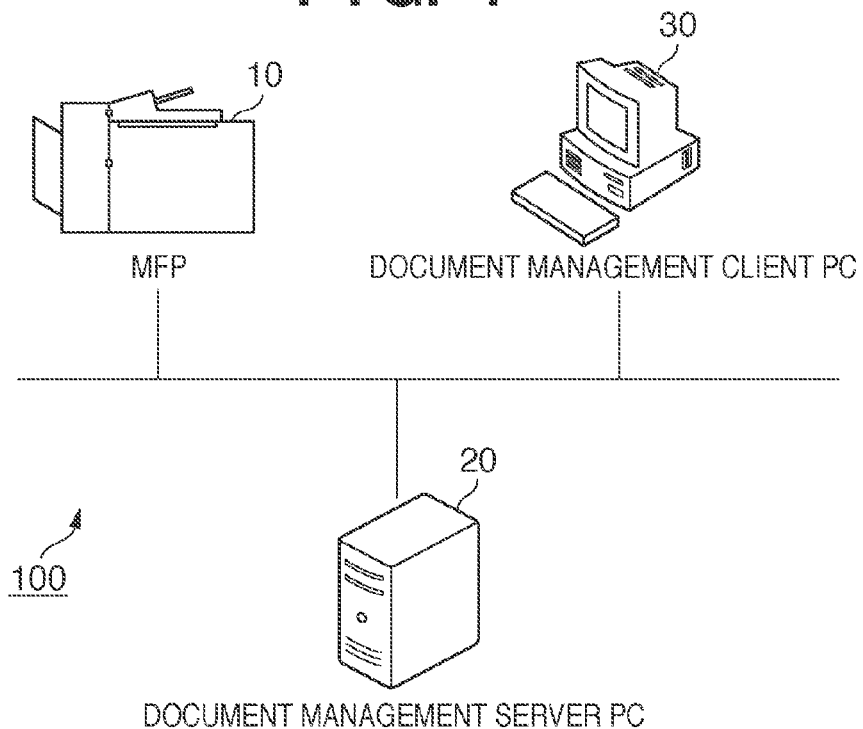
FIG. 1 is a diagram showing an exemplary configuration of a document management system according to a first embodiment.

Firstly, an exemplary configuration of a document management system according to the present embodiment will be described, with reference to FIG. 1. As shown in FIG. 1, a document management system 100 includes an MFP 10 which is an image processing apparatus, a document management server PC 20 which is an information processing apparatus, and a document management client PC 30. These apparatuses are communicably connected to each other via a network such as a LAN. In the present embodiment, the MFP 10 is given as an example of an image processing apparatus, but the present invention is not limited thereto, and can also be applied to a facsimile apparatus or a scanner apparatus.

According to the present embodiment, the MFP 10 transmits document data obtained by scanning a document (hereinafter, scanned document) to the document management server PC 20 via the LAN. The document management server PC 20 saves the scanned document transmitted from the MFP 10. The document management client PC 30 is, for example, used for modifying property information indicating an attribute of the scanned document saved in the document management server PC 20. The document management system 100 thus provides a document management system that saves data read by the MFP 10 in an external apparatus connected via a network.

Configuration of Image Processing Apparatus

Figure 2:
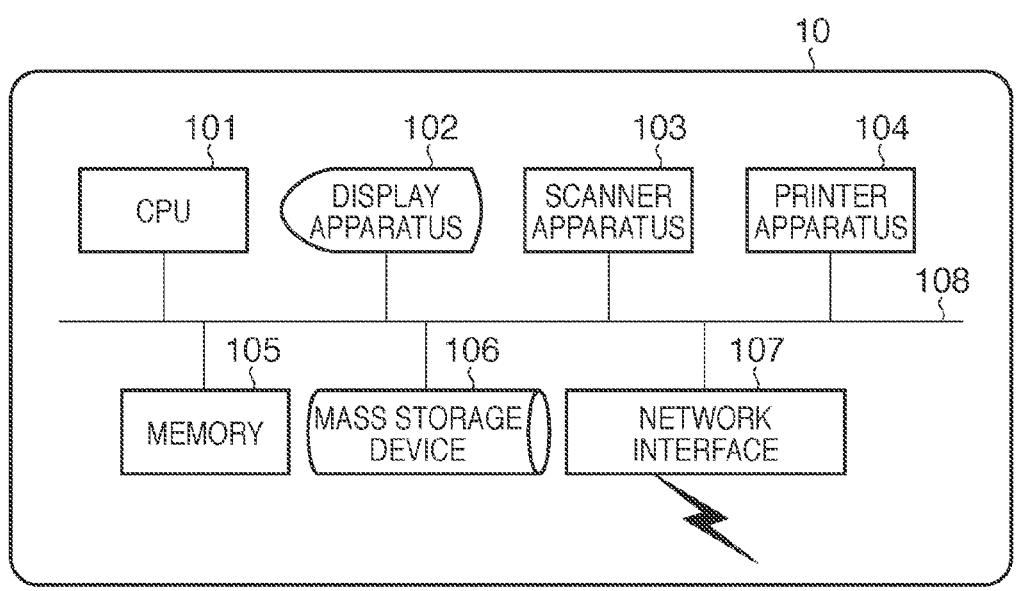
FIG. 2 is a block diagram showing an exemplary configuration of an image processing apparatus according to the first embodiment.

Next, an exemplary hardware configuration of the MFP 10 serving as an image processing apparatus according to the present embodiment will be described, with reference to FIG. 2. Note that, here, description will focus on components that are important in describing the present invention. In other words, the image processing apparatus according to the present invention may include other components in addition to the components described hereinafter. The MFP 10 is provided with a CPU 101, a display apparatus 102, a scanner apparatus 103, a printer apparatus 104, a memory 105, a mass storage device 106, and a network interface 107. These components are connected via an internal bus 108.

The CPU 101 performs overall control of the MFP 10, and is communicably connected to each component via the internal bus 108. The display apparatus 102 displays an operation screen on an operation panel such as a touch panel. Accordingly, a user is able to perform an operation for performing a desired operation or the like, via the operation screen displayed on the display apparatus 102. The scanner apparatus 103, which functions as a reading unit and has the function of an automatic document feeder (ADF) or the like, reads an original conveyed by the ADF, and outputs image data. The printer apparatus 104 outputs an image corresponding to the image data on a recording medium such as paper.

The memory 105 is a work memory area into which different types of application programs that the CPU 101 executes in order to control the MFP 10 are loaded from the mass storage device 106. The mass storage device 106 is used for saving the actual programs of applications in the present embodiment, scanned documents read by the scanner apparatus 103, and the like. Also, the network interface 107 performs transmission/reception of signals with an external apparatus (here, the document management server PC 20 or the document management client PC 30) connected via the LAN in accordance with the CPU 101. In particular, in the present embodiment, the network interface 107 is mainly used in order to perform communication with the document management server PC 20.

Configuration of Information Processing Apparatus

Next, an exemplary hardware configuration of the document management server PC 20 serving as an information processing apparatus according to the present embodiment will be described, with reference to FIG. 3. Note that since the configuration of the document management client PC 30 is similar to the document management server PC 20, description thereof will be omitted. Also, here, description will focus on components that are important in describing the present invention. In other words, an information processing apparatus according to the present invention may include other components in addition to the components described hereinafter.

Figure 3:
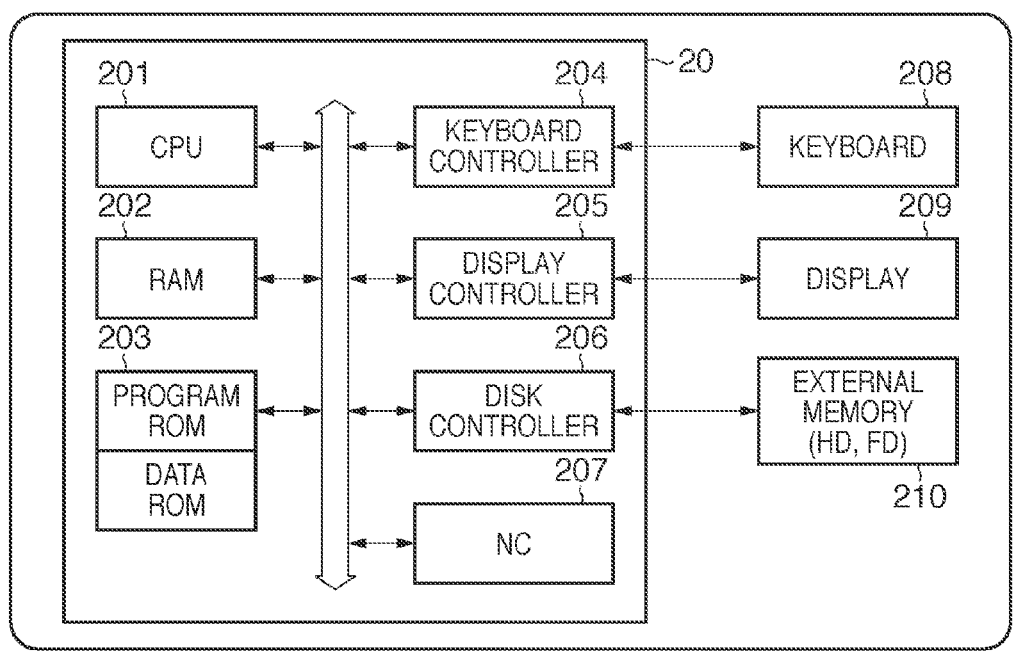
FIG. 3 is a block diagram showing an exemplary configuration of a document management server and a document management client according to the first embodiment.

As shown in FIG. 3, the document management server PC 20 is provided with a CPU 201, a RAM 202, a ROM 203, a keyboard controller 204, a display controller 205, a disk controller 206, and an NC 207. Also, the document management server PC 20 is connected to a keyboard 208, a display 209 and an external memory 210.

The CPU 201 executes a program of an OS (Operating System), an application or the like loaded from a memory such as a program ROM of the ROM 203 into the RAM 202. The processing of after-mentioned flowcharts can be realized by execution of this program. The RAM 202 functions as a main memory, a work area or the like of the CPU 201. The keyboard controller 204 controls key inputs from the keyboard 208 or an unshown pointing device. The display controller 205 controls the different displays on the display 209. The disk controller 206 controls data access to the external memory 210, a floppy (registered trademark) disk (FD), a memory card, or the like storing various data. The NC 207 is connected to the network, and executes communication control processing with other devices connected to the network.

Software Configuration of Document Management System

Figure 4:
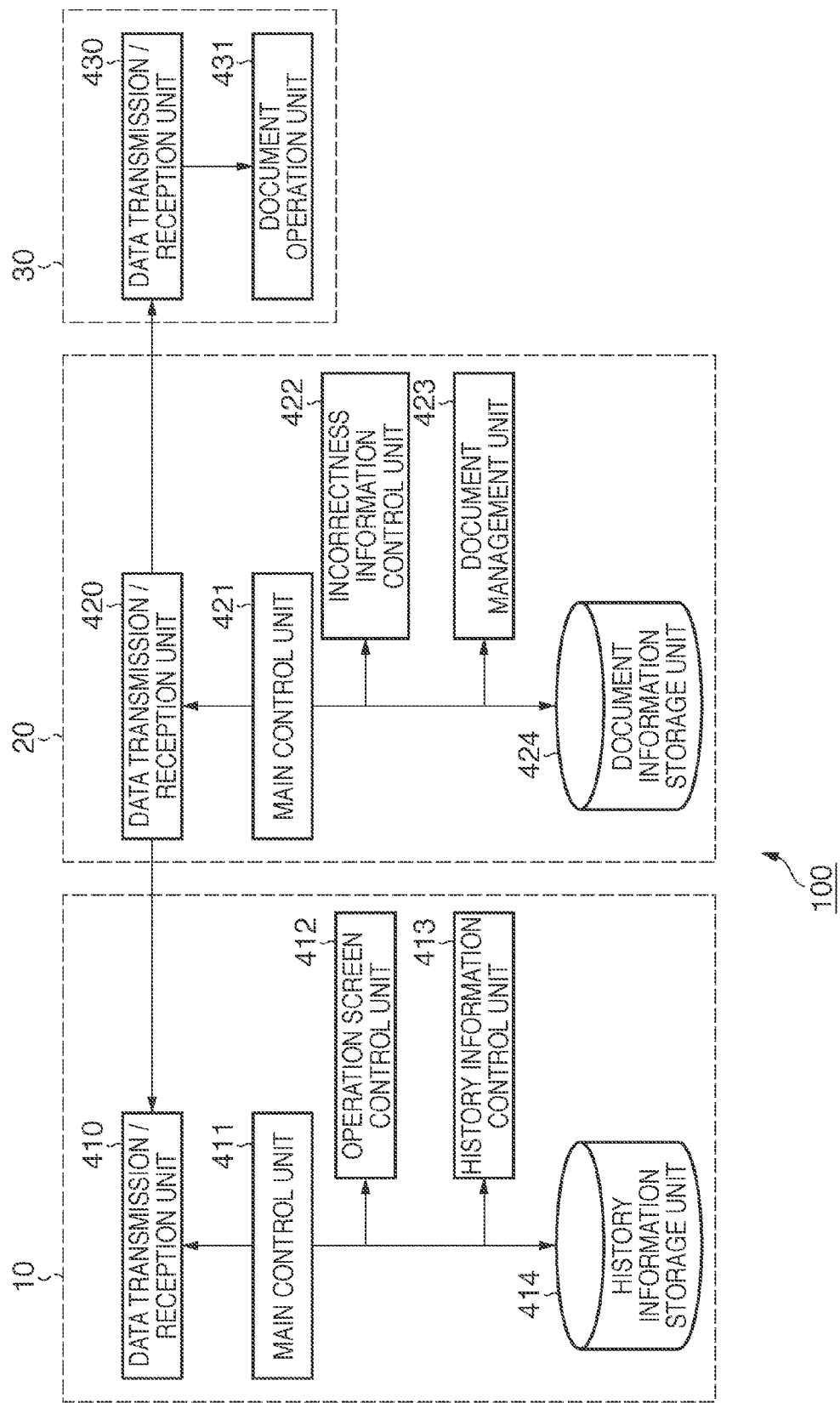
FIG. 4 is a diagram showing an exemplary software configuration of the document management system according to the first embodiment.

Next, a software configuration (functional units) of the document management system 100 according to the present embodiment will be described, with reference to FIG. 4. Note that the software configuration described hereinafter may be realized as hardware that executes these controls, or as a combination of software and hardware.

The MFP 10 is provided with a data transmission/reception unit 410, a main control unit 411, an operation screen control unit 412, a history information control unit 413, and a history information storage unit 414 as functional units. These functional units are realized by the hardware configuration shown in FIG. 2. Specifically, the functional units are realized by the CPU 101 loading an execution program from the mass storage device 106 into the memory 105 and executing the loaded execution program. Note that the CPU 101 executes processing via the main control unit 411. Information such as history information and incorrectness information is also held in the mass storage device 106, and loaded into the memory 105 and processed at the time of program execution.

Here, history information denotes the history of jobs executed by the MFP 10, such as transmission jobs for transmitting scanned documents obtained by scanning a document to the document management server PC 20, for example. Incorrectness information denotes, for example, information in the case where the settings of property information added to a scanned document when transmitting the scanned document to the document management server PC 20 contain incorrect content (i.e., an error). The incorrectness information is transmitted from the document management server PC 20 to the MFP 10. The document management server PC 20 generates the incorrectness information in the case where, for example, property information added to a scanned document held in the document management server PC 20 has been modified via the document management client PC 30, and transmits the generated incorrectness information to the MFP 10. Note that incorrectness information and property information will be discussed in detail later.

The main control unit 411 executes main control processing for controlling applications of the MFP 10. The main control unit 411 controls the data transmission/reception unit 410, the operation screen control unit 412, the history information control unit 413 and the history information storage unit 414 to perform exchange of data such as scanned documents and properties.

An operation screen control unit 412 displays an operation screen for the user to operate on the display unit 102, and accepts information input by the user via the operation screen. The history information control unit 413 manages the history information of scanned documents transmitted by the user, and manages incorrectness information received from the document management server PC 20. Also, the history information control unit 413 retrieves history information matching the job ID held in the incorrectness information from the histories. The history information storage unit 414 holds and reads history information and incorrectness information processed by the history information control unit 413.

The data transmission/reception unit 410 performs transmission and reception of data with the document management server PC 20 via the network interface 107. The document management server PC 20 is provided with a data transmission/reception unit 420, a main control unit 421, an incorrectness information control unit 422, a document management unit 423, and a document information storage unit 424 as functional units. The document management client PC 30 is provided with a data transmission/reception unit 430 and a document operation unit 431 as functional units. These functional units are realized by the hardware configuration in FIG. 3. Specifically, the functional units are realized by the CPU 201 loading an execution program from the external memory 210 into the RAM 202, and executing the loaded execution program. Note that the CPU 201 executes the various processes via the main control unit 421 or the document operation unit 431. Information such as scanned documents and property information is held in the external memory 210, and loaded into the RAM 202 and processed as necessary.

The main control unit 421 executes main control processing for controlling applications of the document management processing server PC 20. The main control unit 421 controls the data transmission unit 420, a workflow control unit 2002, the document management unit 423 and the document information storage unit 424 to perform exchange of data such as documents and properties. The incorrectness information control unit 422 discriminates property input error information notified from the document management client PC 30, and transmits the error information to the MFP 10. The document management unit 423 manages scanned documents and property information received from the MFP 10. The document management unit 423 assigns a unique identifier to a received scanned document, and saves the scanned document to the document information storage unit 424. Also, the document management unit 423 acquires, from the document information storage unit 424, documents requested by the document management client PC 30, and transmits the acquired documents.

The data transmission/reception unit 430 transmits operation information to the document management server PC 20, and performs transmission and reception of scanned documents and property information. The document operation unit 431 displays documents received from the document management server PC 20 on the display 209, and transmits operation information input from the keyboard 208 to the document management server PC 20. The method of inputting incorrectness information is not particularly limited. For example, conceivable methods include property information or the like that is incorrect being instructed from the document management client PC 30 by being checked with a check button or the like, or being handled as incorrectness information by modifying input, although any method is applicable.

Operation Screen

Figure 5:
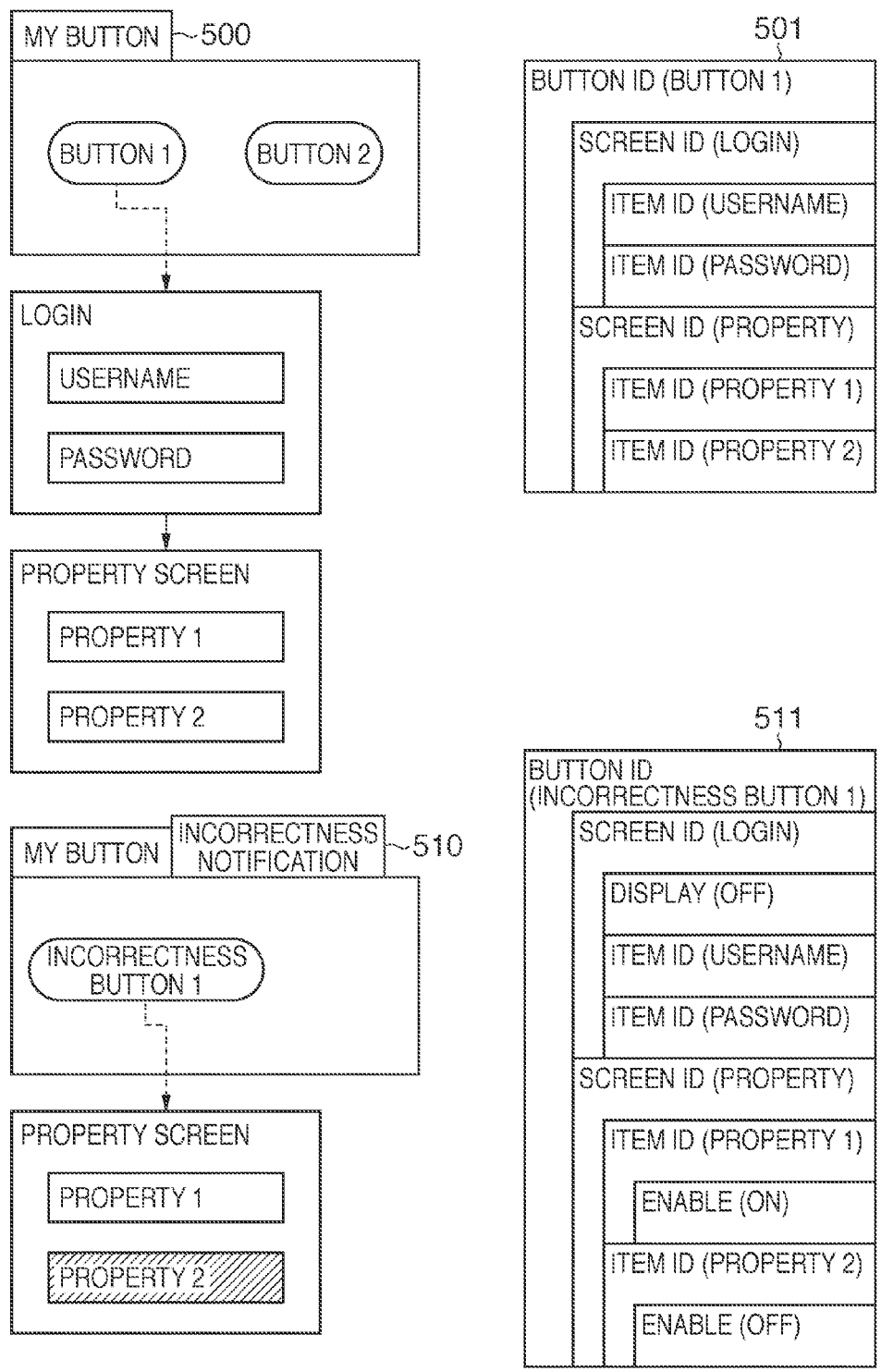
FIG. 5 is a diagram showing an exemplary display configuration of an operation screen according to the first embodiment.

Next, an example of the operation screen displayed on the display apparatus 102 of the MFP 10 according to the present embodiment will be described, with reference to FIG. 5. A screen 500 is constituted by buttons prompting scanning or the like, and tabs classifying the types of buttons. Reference numeral 501 denotes the data configuration of the buttons, and is held as structured data, as shown in FIG. 5. 501 denotes the data configuration of a button 1 on the screen 500, and is constituted by two screens (login and property).

Login (screen ID) is constituted by items prompting input of a username and a password. Property (screen ID) is constituted by items prompting input of a property 1 and a property 2. If the user presses the button 1, the operation screen control unit 412 reads the data of 501 and displays the login screen and property screen on the display apparatus 102, prompting the user to perform input.

A screen 510 shows a notification in the case of there being incorrectness information. If there is incorrectness information, the operation screen control unit 412 displays an incorrectness notification tab, and a button prompting modification of the incorrectness information in the incorrectness notification tab. Reference numeral 511 denotes the data configuration of an incorrectness button 1, and is held as structured data similarly to 501, with an example in the case where the property 1 is incorrectness information being shown. The main control unit 411 assigns an item for turning off display of the login screen to the incorrectness button 1 on the screen 510, and assigns an item for disabling a property 2 to the property screen. With 511, enable (ON) is assigned to the items of property 1, but it is possible to perform display in the case enable (ON) is not provided.

If the user presses the incorrectness button 1, the operation screen control unit 412 reads the data of 511 and, skipping the login screen, displays the property screen on the display apparatus 102. Here, the operation screen control unit 412 displays the property screen such that the property 1 is enabled, prompting input thereof, and the property 2 is disabled, preventing input thereof.

The button data configuration of 501 and 511 may be structured data such as XML or may be data such as CSV. Also, with the creation of the incorrectness button 1, the screens and items are handled as being either hidden or disabled, but the actual screens or items may be deleted from the data.

Creation of Incorrectness Button

Figure 6:
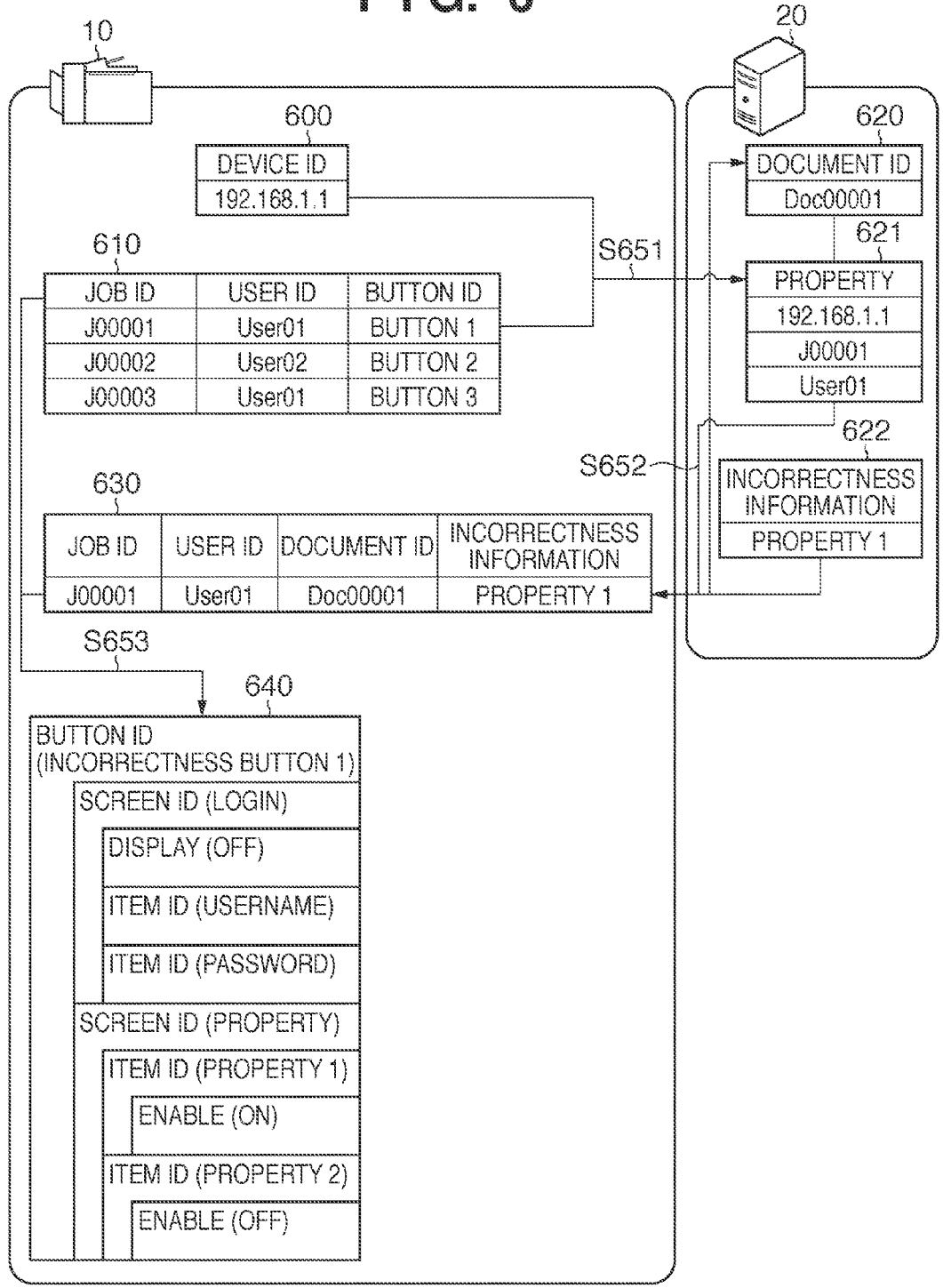
FIG. 6 is a diagram for explaining a procedure for creating an incorrectness button according to the first embodiment.

Next, a procedure for creating the incorrectness button according to the present embodiment will be described, with reference to FIG. 6. When a scan request from a user is received, the main control unit 411 of the MFP 10 acquires a device ID (device identifier) 600, and a job ID (job identifier: J00001 in FIG. 6) and a user ID (user identifier: User01 in FIG. 6) from job history information 610. Further, the main control unit 411, in S651, sets the acquired identifiers in property information, and transmits the property information to the document management server PC 20.

The document management unit 423 of the document management server PC 20 saves a document ID 620 (Doc 00001 in FIG. 6) and property information 621 (device ID, job ID, user ID) in the document information storage unit 424. Also, if there is input of incorrectness information 622 (property 1 in FIG. 6) from a user, the document management unit 423 acquires the device ID from the property information 621. Further, the document management unit 423, in S652, transmits the document ID 620, the property information 621 (job ID, user ID) and incorrectness information 622 to the MFP 10 in association with each other.

The history information control unit 413 of the MFP 10 saves incorrectness information 630 to the history information storage unit 414. The main control unit 411, on receipt of a login request from a user, performs a keyword search using the user ID of the logged in user, and retrieves a matching user ID from the user IDs of incorrectness information 630. If there is incorrectness information having a matching user ID, the main control unit 411 retrieves the job ID of the incorrectness information 630 from the job history information 610, and acquires the button ID (button 1 in FIG. 6) of the matching job ID. The main control unit 411, in S653, sets the screen (login screen in FIG. 6) and items (property 2 in FIG. 6) not required in modifying incorrectness information to off based on the button ID, and creates data 640 for the incorrectness button.

Processing Flow

Figure 7:
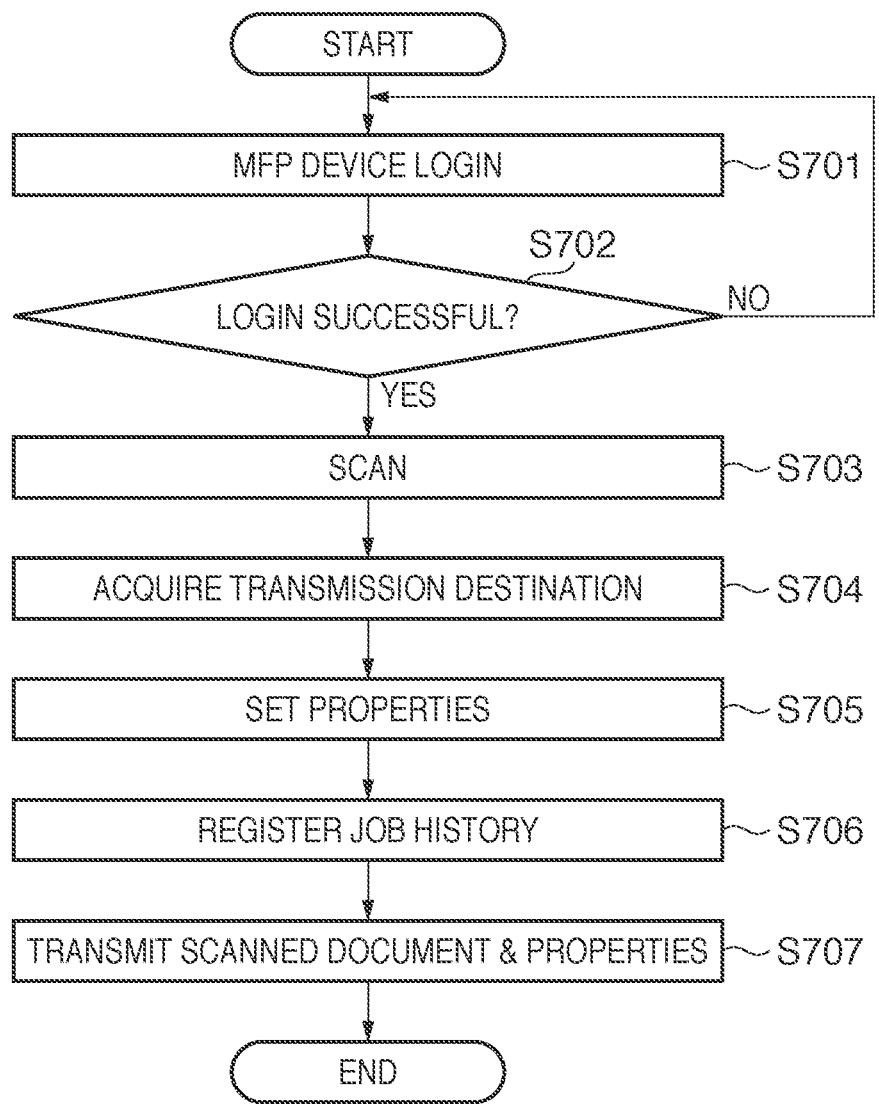
FIG. 7 is a flowchart showing a processing procedure for registering a scanned document according to the first embodiment.
Figure 8:
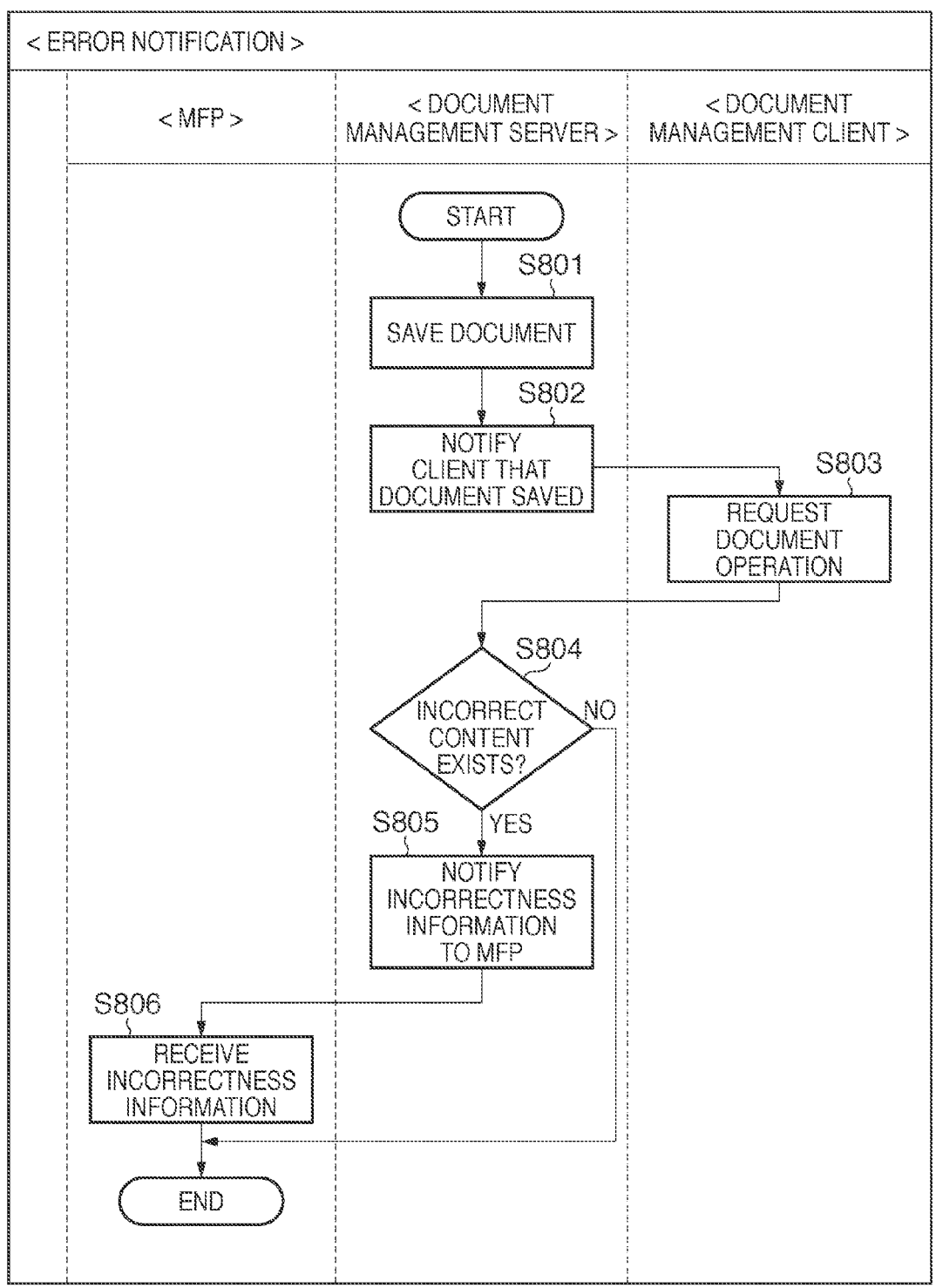
FIG. 8 is a flowchart showing a processing procedure for notifying incorrectness information according to the first embodiment.
Figure 9:
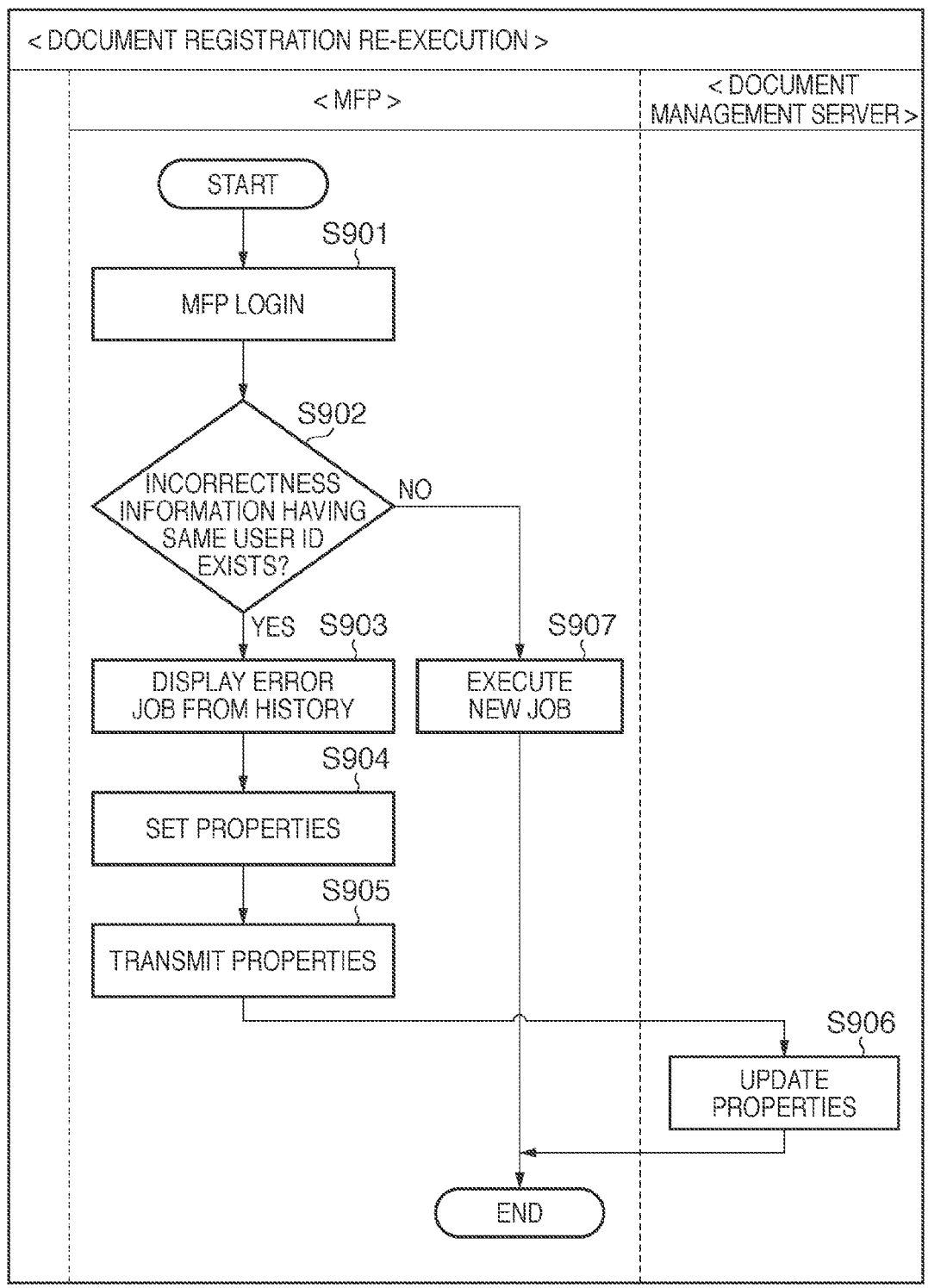
FIG. 9 is a flowchart showing a processing procedure for setting document properties from incorrectness information according to the first embodiment.

Hereinafter, the processing flow of the document management system of the present embodiment will be described, with reference to FIGS. 7 to 9. FIG. 7 shows a flowchart for registering a scanned document from the MFP 10 to the document management server PC 20. FIG. 8 shows a flowchart for transmitting property information from the document management server PC 20 to the MFP 10. FIG. 9 shows a flowchart for updating property information from the MFP 10 to the document management server PC 20. Note that the processing described hereinafter is, in the MFP 10, realized by the CPU 101 reading out an execution program prestored in the mass storage device 106 to the memory 105, and executing the read execution program. Also, the processing described hereinafter is, in the document management server PC 20 and the document management client PC 30, realized by the CPU 201 reading out an execution program from the ROM 203, the external memory 210 or the like to the RAM 202, and executing the read execution program.

Scanned Document Registration

Firstly, a processing procedure according to which the MFP 10 registers a scanned document in the document management server PC 20 will be described, with reference to FIG. 7. This flowchart is constituted by processing for scanning a document desired by the user, selecting a transmission destination, setting properties of the scanned document, and transmitting the scanned document. Note that the MFP 10 holds unique IDs (IP addresses, etc.) and, when executing a scanning process, assigns a unique identifier (hereinafter, job ID) for every device and saves the assigned identifier as a history. Also, the MFP 10 prompts the user of the MFP 10 to input a username and a password, and requests the user to log in. Usernames are uniquely managed per MFP, and a unique identifier (hereinafter, user ID) is assigned.

Firstly, in S701, the operation screen control unit 412 displays an operation screen for inputting a username and a password on the display apparatus 102, in order to prompt the user to login, and accepts a username and password input by the user. Subsequently, in S702, the main control unit 411 judges whether the user ID and password input by the user are correct. If correct, the processing proceeds to S703, and if not correct, on the other hand, the processing returns the processing to S701, where the main control unit 411 displays the operation screen for inputting a username and a password again.

In S703, the operation screen control unit 412 displays an operation screen for accepting a document scan request to the user, and accepts a request to scan a paper document desired by the user via the operation screen. On receipt of a scan request, the main control unit 411 executes a scanning process using the scanner apparatus 103. Subsequently, in S704, the operation screen control unit 412 displays an operation screen for accepting a transmission destination of the scanned document desired by the user, and accepts input of a transmission destination selected by the user, via the operation screen. Further, in S705, the operation screen control unit 412 displays an operation screen for inputting property information desired by the user, and accepts information input by the user via the operation screen. Further, the main control unit 411, functioning as a property information generation unit, generates property information corresponding to the scanned document obtained at S703 from the information accepted via the operation screen.

Next, in S706, the history information control unit 413 assigns a job ID to the history information of the scanning process (scan job), and saves the history information to the history information storage unit 414. Also, the history information control unit 413 sets the device ID, job ID and user ID in the property information input by the user. Subsequently, in S707, the main control unit 411 transmits the scanned document and property information to the document management server PC 20, via the data transmission/reception unit 410. Here, the data transmission/reception unit 410 is an example of a first transmission unit.

Incorrectness Information Notification

Next, a processing procedure according to which the document management server PC 20 notifies incorrectness information to the MFP 10 after receiving a scanned document from the MFP 10 will be described, with reference to FIG. 8. This flowchart is constituted by processing for managing scanned documents and property information, and for notifying incorrectness information to the MFP 10, based on operation content desired by a user via the document management client PC 30. Note that the document management server PC 20 assigns a unique identifier (hereinafter, document ID) for every document, in order to manage saved documents.

Firstly, in S801, the main control unit 421 of the document management server PC 20 receives a scanned document and property information from the MFP 10, via the data transmission/reception unit 420. Further, the main control unit 421 assigns a document ID to the received scanned document, and saves the scanned document to the document information storage unit 424 in association with the property information. Subsequently, in S802, the main control unit 421 notifies the fact that a document has been saved to the document management client PC 30.

In S803, the document operation unit 431 of the document management client PC 30 receives a document saved notification from the document management server PC 20, via the data transmission/reception unit 430, and displays an operation screen prompting the user to perform an operation. The document operation unit 431 accepts desired operation content requested by the user, and transmits the operation information to the document management server PC 20. Here, the user checks the property information via the operation screen, and is able to designate an item containing an error, from the items included in the property information. That is, if an error item of the property information is designated in the operation information, transmission of the operation information serves as a request for modification of property information from the document management client PC 30 to the document management server PC 20.

In S804, the main control unit 421, functioning as a request reception unit, passes operation information received from the document management client PC 30 to the incorrectness information control unit 422. The incorrectness information control unit 422 analyzes the received operation information and determines whether there is incorrectness information. In other words, the incorrectness information control unit 422 determines, from the received operation information, whether there exists an item containing an error designated by the user in the items included in the property information. Here, in the case where there is incorrectness information, the incorrectness information control unit 422 acquires the device ID, job ID and user ID from the document ID and property information stored in the document information storage unit 424. Thereafter, in S805, the incorrectness information control unit 422 transmits the job ID, user ID and incorrectness information, with the device shown by the acquired device ID (here, MFP 10) as the transmission destination. Here, the incorrectness information control unit 422 is an example of an error information generation unit. Also, incorrectness information transmitted to the MFP 10 includes an item ID (item identifier) indicating which item in the property information contains an error.

In S806, the main control unit 411 passes incorrectness information received from the document management server PC 20 to the history information control unit 413. The history information control unit 413 additionally saves the received incorrectness information to the history information storage unit 414.

Document Registration Re-Execution

Next, a processing procedure according to which the MFP 10 resets property information from incorrectness information will be described, with reference to FIG. 9. This flowchart is constituted by processing for determining whether a user ID included in incorrectness information matches the logged in user ID (search process), acquiring job history information from incorrectness information having a matching user ID, displaying an operation screen prompting the user to modify the incorrectness information, and reconfiguring the settings.

Firstly, in S901, the operation screen control unit 412 displays on the display apparatus 102 an operation screen for inputting a user ID and a password, prompting the user to login, and executes user authentication using the username and password input by the user. If user authentication is successful, login of the user is approved. Subsequently, in S902, the main control unit 411 performs a search as to whether incorrectness information having the same user ID as the user ID with which the user requested login is stored in the history information storage unit 414. If incorrectness information having the same user ID as the user ID of the user does not exist, the processing proceeds to S907, where the operation screen control unit 412 displays on the display apparatus 102 an operation screen prompting the user to scan a document, and accepts a request for scanning a desired paper document from the user via the operation screen. Thereafter, the main control unit 411 executes a scanning process using the scanner apparatus 103, and ends the processing. That is, this scanning process is a new job.

On the other hand, if, at S902, incorrectness information having the same user ID as the user ID of the user does exist, the processing proceeds to S903, where the main control unit 411 acquires matching job information from the history information storage unit 414 based on the job ID included in the incorrectness information and the job ID included in the job history. Further, the operation screen control unit 412 displays an operation screen prompting the user to reregister a document on the display apparatus 102, and receives a request to reregister a scanned document desired by the user.

Next, in S904, the operation screen control unit 412 displays on the display apparatus 102 a modification screen for modifying information targeted as incorrect, and accepts properties (i.e., modification information) desired by the user that are input via the operation screen. In other words, the operation screen control unit 412 specifies incorrect information in the property information from the item ID included in the incorrectness information notified at S805, and displays a modification screen in a manner that enables the information to be modified. Note that the processing of the operation screen control unit 412 in S904 is an example of processing by a display control unit. Subsequently, in S905, the main control unit 411 transmits the modified property information to the document management server PC 20, via the data transmission/reception unit 410. Here, the data transmission/reception unit 410 is an example of a second transmission unit. In S906, the main control unit 421 of the document management server PC 20 receives the modified property information, and updates (overwrites) the property information in the document information storage unit 424.

As described above, the document management system according to the present embodiment, when transmitting a scanned document from the MFP 10 to the document management server PC 20, assigns property information of the scanned document, and stores history information related to the transmission job in a memory. Further, the MFP 10, on receipt of incorrectness information related to property information from the document management server PC 20, adds the incorrectness information to the history information. Thereafter, when the user logs into the MFP 10, the MFP 10 determines whether incorrectness information is included in history information having the same user ID as the user ID of the user, and, if there is incorrectness information, displays a modification screen for modifying incorrect property information. Further, when property information is modified via the modification screen, the MFP 10 transmits the modified information to the document management server PC 20, and updates information managed by the document management server PC 20. With the document management system according to the present embodiment, property information can thus be modified, without retransmitting a corresponding scanned document from the MFP 10, even in the case where property information such as mentioned above contains incorrect content. Also, the user is able to easily check for jobs containing incorrect content, since the modification screen is displayed in the case where the user is logged into the MFP 10. Also, the user is able to easily modify incorrect content, as a result of the item of property information to be modified being displayed on the modification screen.

Second Embodiment

Figure 10:
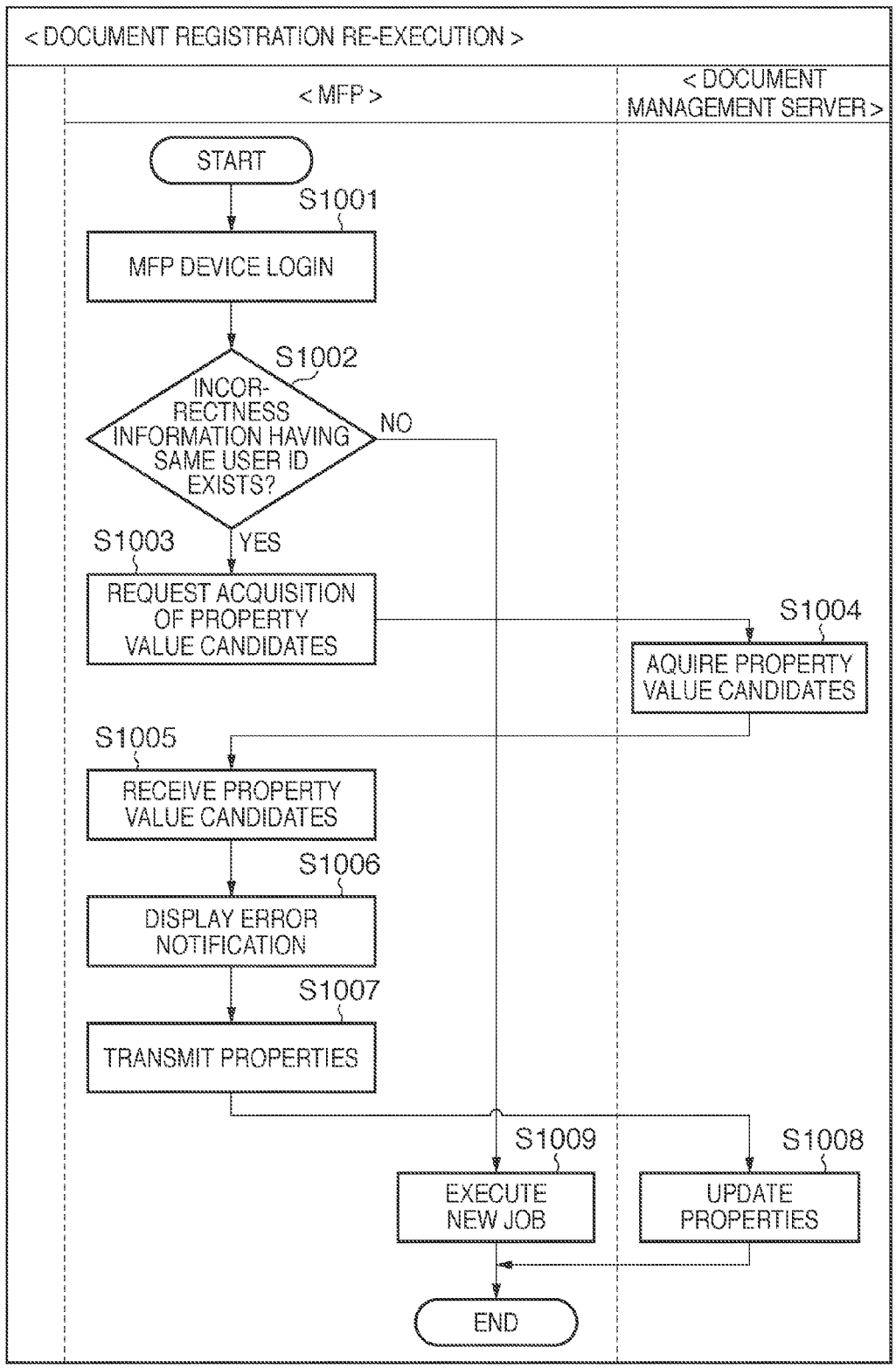
FIG. 10 is a flowchart showing a processing procedure for displaying input candidates for incorrectness information according to a second embodiment.

Hereinafter, a second embodiment of the present invention will be described, with reference to FIG. 10. Hereinafter, only techniques that differ from the above embodiment will be described. Accordingly, in the present embodiment, control of the re-execution of document registration described using the flowchart of FIG. 9 will be described. Since the other configurations and techniques are similar to the first embodiment, description thereof will be omitted.

Document Registration Re-Execution

In the present invention, processing for assisting the user with values to be input is added to the operation screen display prompting the user to modify incorrect information in FIG. 9. In other words, candidates of property information to be modified are displayed. User-friendliness can thereby be further improved, in addition to the effects of the above embodiment.

Firstly, in S1001, the operation screen control unit 412 displays on the display apparatus 102 an operation screen for inputting a username and a password, prompting the user to login, accepts a username and password input by the user, and executes a process for logging in the user. Subsequently, in S1002, the main control unit 411 performs a search as to whether incorrectness information having the same user ID as the user ID with which the user requested login is stored in the history information storage unit 414. If incorrectness information having the same user ID as the user ID of the user does not exist, the processing proceeds to S1009, where the operation screen control unit 412 displays on the display apparatus 102 an operation screen prompting the user to scan a document, and accepts a request for scanning a desired paper document from the user via the operation screen. Thereafter, the main control unit 411 executes a scanning process using the scanner apparatus 103, and ends the processing. That is, this scanning process is a new job.

On the other hand, if, at S1002, incorrectness information having the same user ID as the user ID of the logged in user does exist, the processing proceeds to S1003, where the main control unit 411, functioning as a candidate request unit, requests the document management server PC 20 for input candidate information for the property that is incorrect information. In S1004, the main control unit 421 of the document management server PC 20, functioning as a response unit, acquires property values set for other documents from the document information storage unit 424, and transmits the property values to the MFP 10 as input candidate information for the property.

Next, in S1005, the main control unit 411 of the MFP 10 transmits the property values received as input candidate information to the operation screen control unit 412. In S1006, the operation screen control unit 412 displays the property values received at S1005 on an operation screen prompting the user to reregister a document, and accepts a request for reregistering a desired scanned document from the user. Subsequently, in S1007, the main control unit 411 transmits accepted property information to the document management server PC 20, via the data transmission/reception unit 410. In S1008, the main control unit 421 of the document management server PC 20 receives the property information, and saves property information of the document to the document information storage unit 424.

Other Embodiments

Aspects of the present invention can also be realized by a computer of a system or apparatus (or devices such as a CPU or MPU) that reads out and executes a program recorded on a memory apparatus to perform the functions of the above-described embodiment(s), and by a method, the steps of which are performed by a computer of a system or apparatus by, for example, reading out and executing a program recorded on a memory apparatus to perform the functions of the above-described embodiment(s). For this purpose, the program is provided to the computer for example via a network or from a recording medium of various types serving as the memory apparatus (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-153482, filed on Jul. 5, 2010, which is hereby incorporated by reference herein in its entirety.

What is claimed is:

1. A document management system comprising a document management server and an image processing apparatus that are connected via a network,
the image processing apparatus comprising:
a reading unit that reads a document and outputs document data;
a property information generation unit that generates property information indicating an attribute of the document data output from the reading unit;
a first transmission unit that transmits the document data and the property information to the document management server;
a storage unit that stores, in a memory, the property information related to the document data transmitted by the first transmission unit;
an addition unit that, on receipt, from the document management server, of error information representing that an error is contained in the property information which the first transmission unit has transmitted to the document management server, stores the received error information in the memory in association with the property information;
a display control unit that displays, on a display unit, a modification screen for modifying erroneous property information if the error information is stored in the memory; and
a second transmission unit that transmits modified property information input via the modification screen to the document management server, and
the document management server comprising:
a management unit that manages the document data and property information transmitted by the first transmission unit;
an error information generation unit that analyzes the property information managed by the management unit, and generates error information if the property information contains an error;
a notification unit that notifies the error information generated by the error information generation unit to the image processing apparatus; and
an update unit that updates the property information managed by the management unit, in accordance with the modified property information transmitted by the second transmission unit.

2. The document management system according to claim 1, wherein the document management server further comprises a request reception unit that receives a modification request for information managed by the management unit, from a document management client connected to the document management server via the network, and
the error information generation unit analyzes the modification request received by the request reception unit, and generates, as the error information, an item identifier indicating what information is to be modified, out of property information managed by the management unit.

3. The document management system according to claim 2, wherein the display control unit displays the modification screen on the display unit in a manner that enables modification of property information indicated by the item identifier.

4. The document management system according to claim 1, wherein the image processing apparatus further comprises a user authentication unit that authenticates a user,
wherein the property information comprises at least a device identifier indicating the image processing apparatus, a job identifier indicating a job for which the document data and the property information were transmitted by the first transmission unit, and a user identifier indicating a user who has been authenticated by the user authentication unit and who instructed execution of the job, and
wherein the display control unit determines whether there is incorrectness information in the property information including the same user identifier as a user identifier of the user authenticated by the authentication unit.

5. The document management system according to claim 1, wherein the image processing apparatus further comprises a candidate request unit that requests the document management server for candidate information for modifying the erroneous property information,
wherein the document management server further comprises a response unit that acquires candidate information requested by the candidate request unit from other property information managed by the management unit, and transmits the acquired candidate information to the image processing apparatus, and
wherein the display control unit displays, on the modification screen, candidate information received from the document management server in response to the request by the candidate request unit.

6. An image processing apparatus connected to a document management server via a network, comprising:
a reading unit that reads a document and outputs document data;
a property information generation unit that generates property information indicating an attribute of the document data output from the reading unit;
a first transmission unit that transmits the document data and the property information to the document management server;
a storage unit that stores, in a memory, the property information related to the document data transmitted by the first transmission unit;
an addition unit that, on receipt, from the document management server, of error information representing that an error is contained in the property information which the first transmission unit has transmitted to the document management server, stores the received error information in the memory in association with the property information;

a display control unit that displays, on a display unit, a modification screen for modifying erroneous property information if the error information is stored in the memory; and a second transmission unit that transmits modified property information input via the modification screen to the document management server.

7. A control method for a document management system in which a document management server and an image processing apparatus are connected via a network, comprising:

in the image processing apparatus, performing the steps of:

reading a document and outputting document data, using a reading unit of the image processing apparatus;

generating property information indicating an attribute of the document data output from the reading unit, using a property information generation unit of the image processing apparatus;

transmitting the document data and the property information to the document management server, using a first transmission unit of the image processing apparatus; and storing, in a memory, the document data and property information transmitted by the first transmission unit;

in the document management server, performing the steps of:

managing the transmitted document data and property information transmitted by the first transmission unit of the image processing apparatus, using a management unit of the document management server;

analyzing the property information managed by the management unit, and generating error information if the property information contains an error, using an error information generation unit of the document management server; and notifying the error information generated by the error information generation unit to the image processing apparatus, using a notification unit of the document management server;

in the image processing apparatus, further performing the steps of:

storing, on receipt, from the document management server, of error information representing that an error is contained in the property information which the first transmission unit has transmitted to the document management server, the received error information in the memory in association with the property information, using an addition unit of the image processing apparatus;

displaying, on a display unit, a modification screen for modifying erroneous property information if the error information is stored in the memory, using a display control unit of the image processing apparatus; and transmitting modified property information input via the modification screen to the document management server, using a second transmission unit of the image processing apparatus; and in the document management server, further performing the step of:

updating the property information managed by the management unit, in accordance with the modified property information transmitted by the second transmission unit, using an update unit of the document management server.

8. A control method executed in an image processing apparatus connected to a document management server via a network, comprising:

reading a document and outputting document data, using a reading unit;

generating property information indicating an attribute of the document data output from the reading unit, using a property information generation unit;

transmitting the document data and the property information to the document management server, using a first transmission unit;

storing, in a memory, the property information related to the document data transmitted by the first transmission unit, using a storage unit;

storing, on receipt, from the document management server, of error information representing that an error is contained in the property information which the first transmission unit has transmitted to the document management server, the received error information in the memory in association with the property information, using an addition unit;

displaying, on a display unit, a modification screen for modifying erroneous property information if the error information is stored in the memory, using a display control unit; and transmitting modified property information input via the modification screen to the document management server, using a second transmission unit.

9. A non-transitory computer-readable storage medium storing computer executable code of a computer program for causing a computer to execute the control method for a document management system according to claim 7.

10. A non-transitory computer-readable storage medium storing computer executable code of a computer program for causing a computer to execute the control method for an image processing apparatus according to claim 8.

* * * * *